O. W. MOBERG.
BUTTER SERVER.
APPLICATION FILED NOV. 10, 1908.

927,158.

Patented July 6, 1909.
7 SHEETS—SHEET 3.

WITNESSES

INVENTOR
Otto W. Moberg
BY Munn & Co
ATTORNEYS

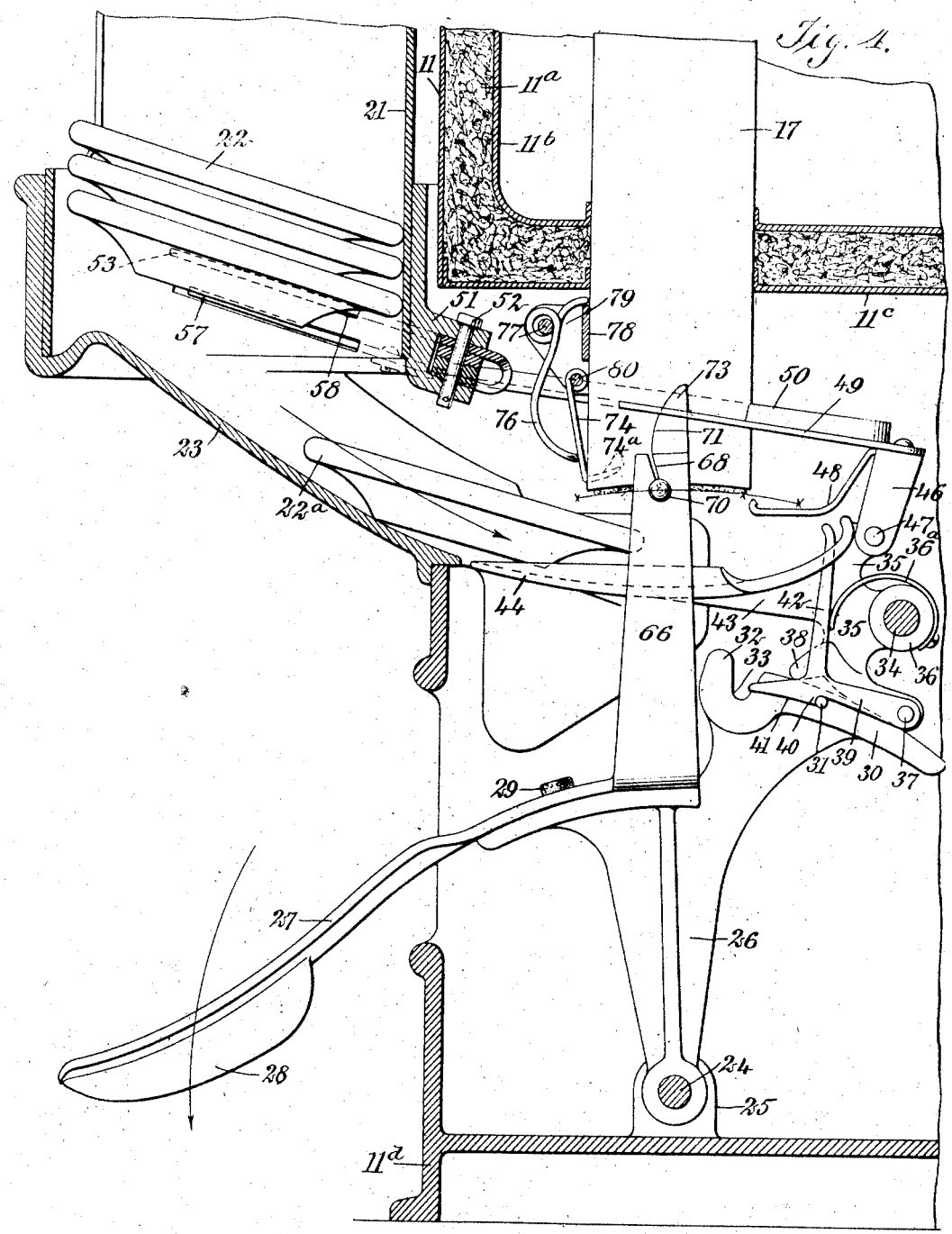

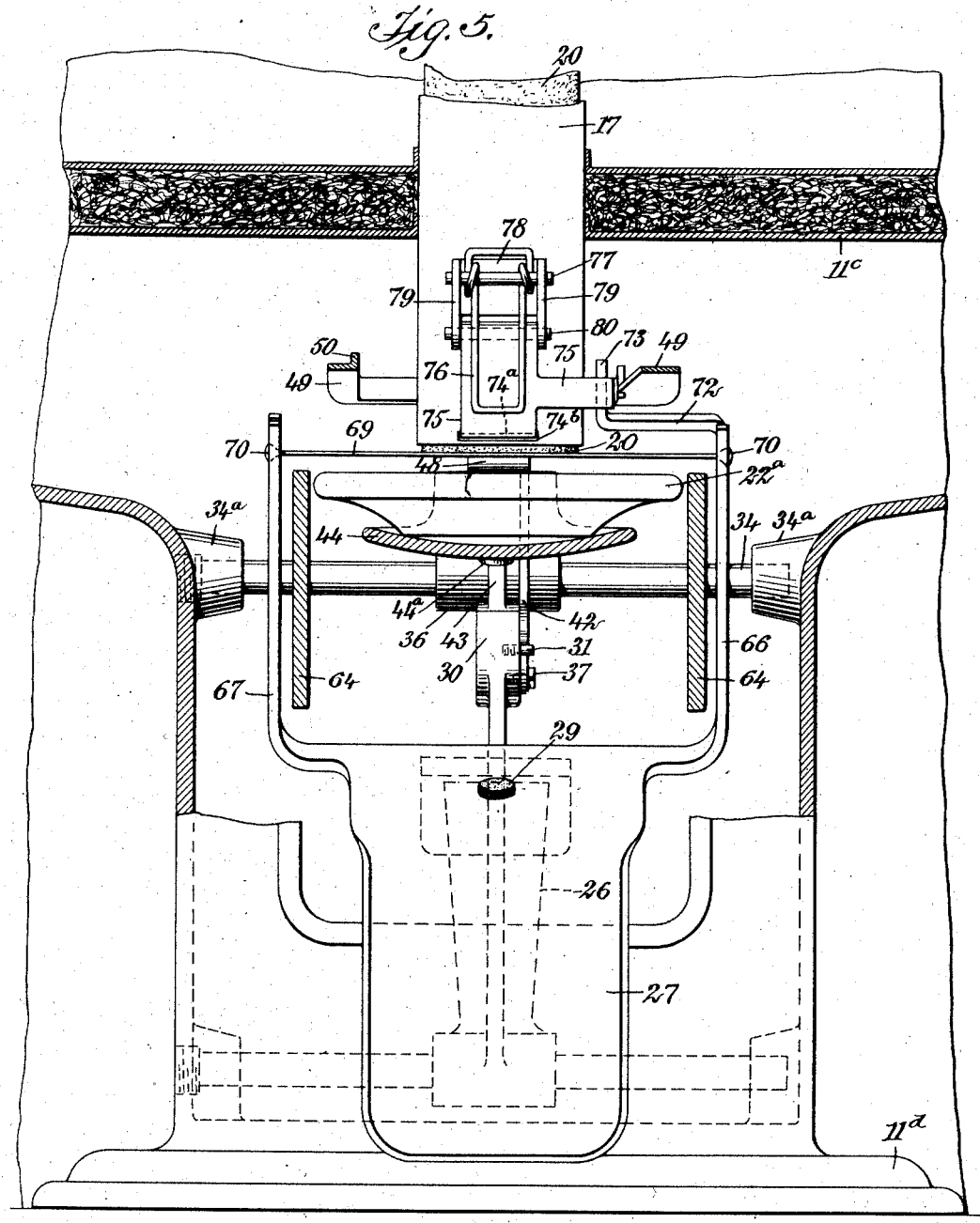

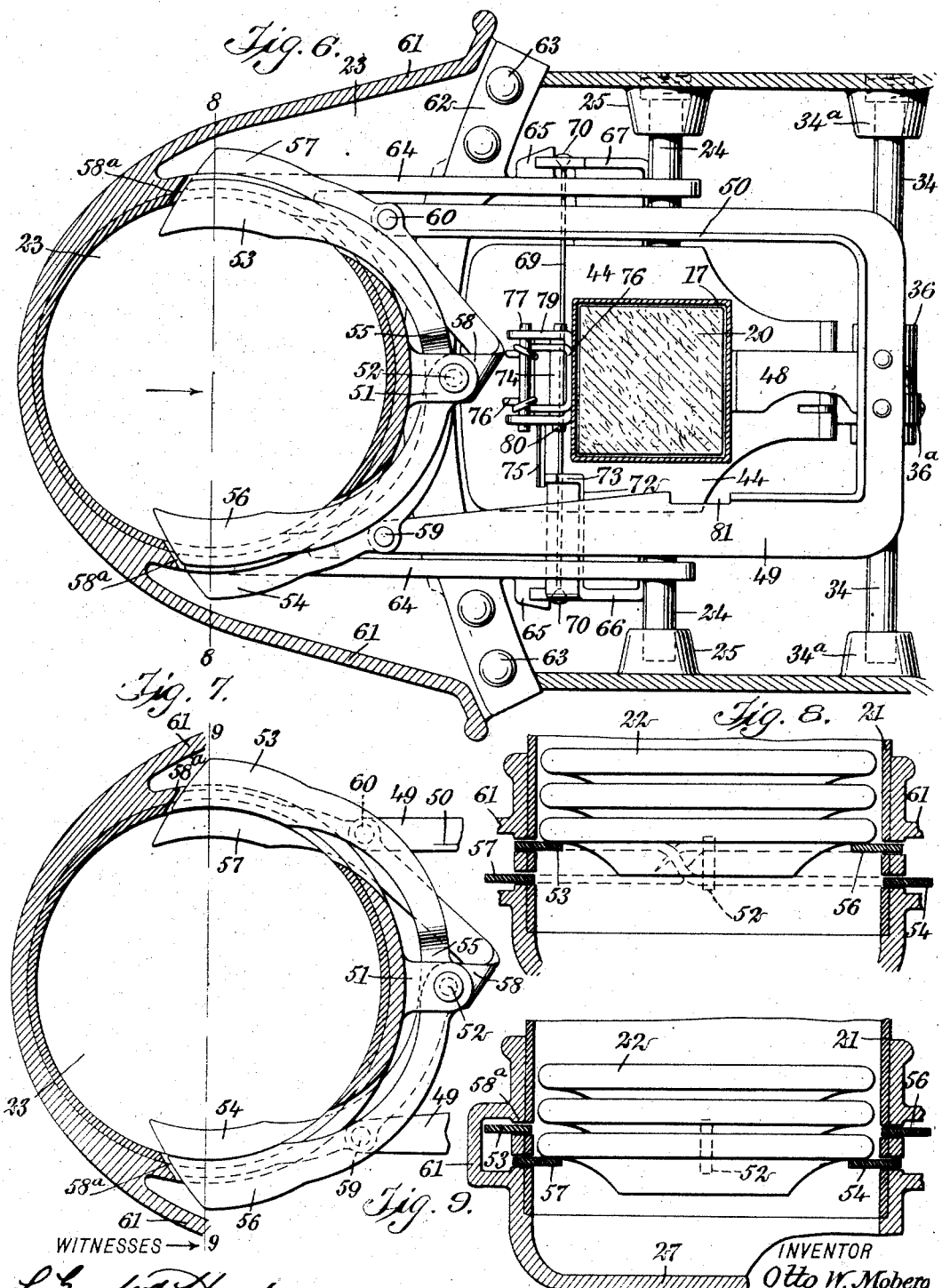

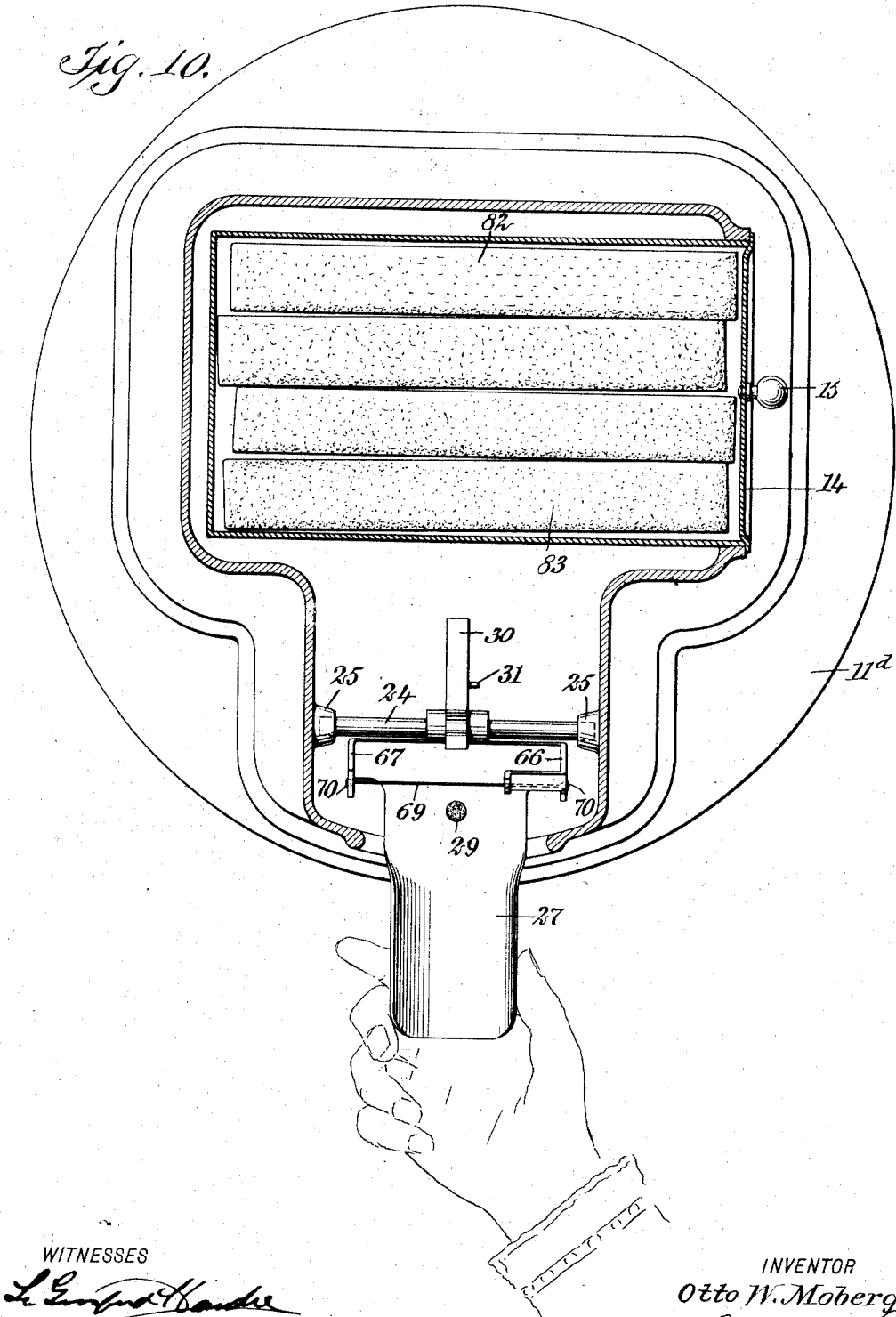

UNITED STATES PATENT OFFICE.

OTTO W. MOBERG, OF SEATTLE, WASHINGTON.

BUTTER-SERVER.

No. 927,158.   Specification of Letters Patent.   Patented July 6, 1909.

Application filed November 10, 1908. Serial No. 461,860.

*To all whom it may concern:*

Be it known that I, OTTO W. MOBERG, a citizen of the United States, and a resident of Seattle, in the county of King and State of Washington, have invented a new and Improved Butter-Server, of which the following is a full, clear, and exact description.

My invention relates to butter servers, my general purpose being to provide an improved construction whereby the following objects are accomplished: I. To enable the empty butter dishes to be stacked in the form of a column and removed one at a time filled with butter and ejected from the machine, all by the simple movement of a manually-controlled member. II. To stop the action of the machine and lock certain movable parts thereof in case of breakage of the wire used for cutting the butter. III. To prevent the stock of butter from moving in the machine except for the purpose of filling a butter dish. IV. To provide improved mechanism for effecting the disengagement of the butter dishes from the bottom of the column of such dishes. V. To provide for the proper refrigeration and storage of the stock of butter to be used, so as to maintain the same in suitable form to be acted upon by the machine. VI. To provide numerous details of construction for the purpose of promoting simplicity of parts and accuracy of action.

Reference is to be had to the accompanying drawings forming a part of this specification, in which similar characters of reference indicate corresponding parts in all the figures.

Figure 1:
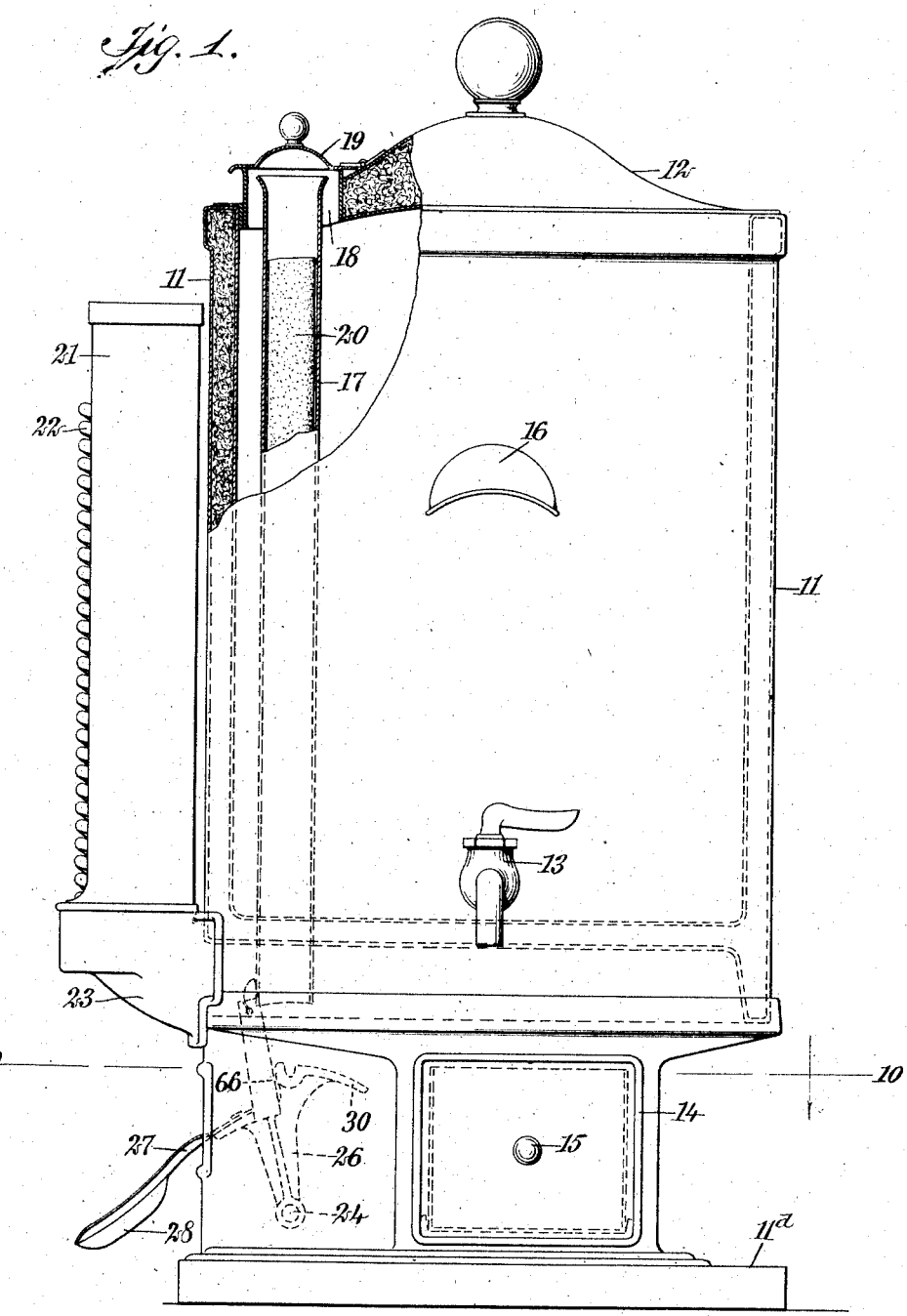
Figure 2:
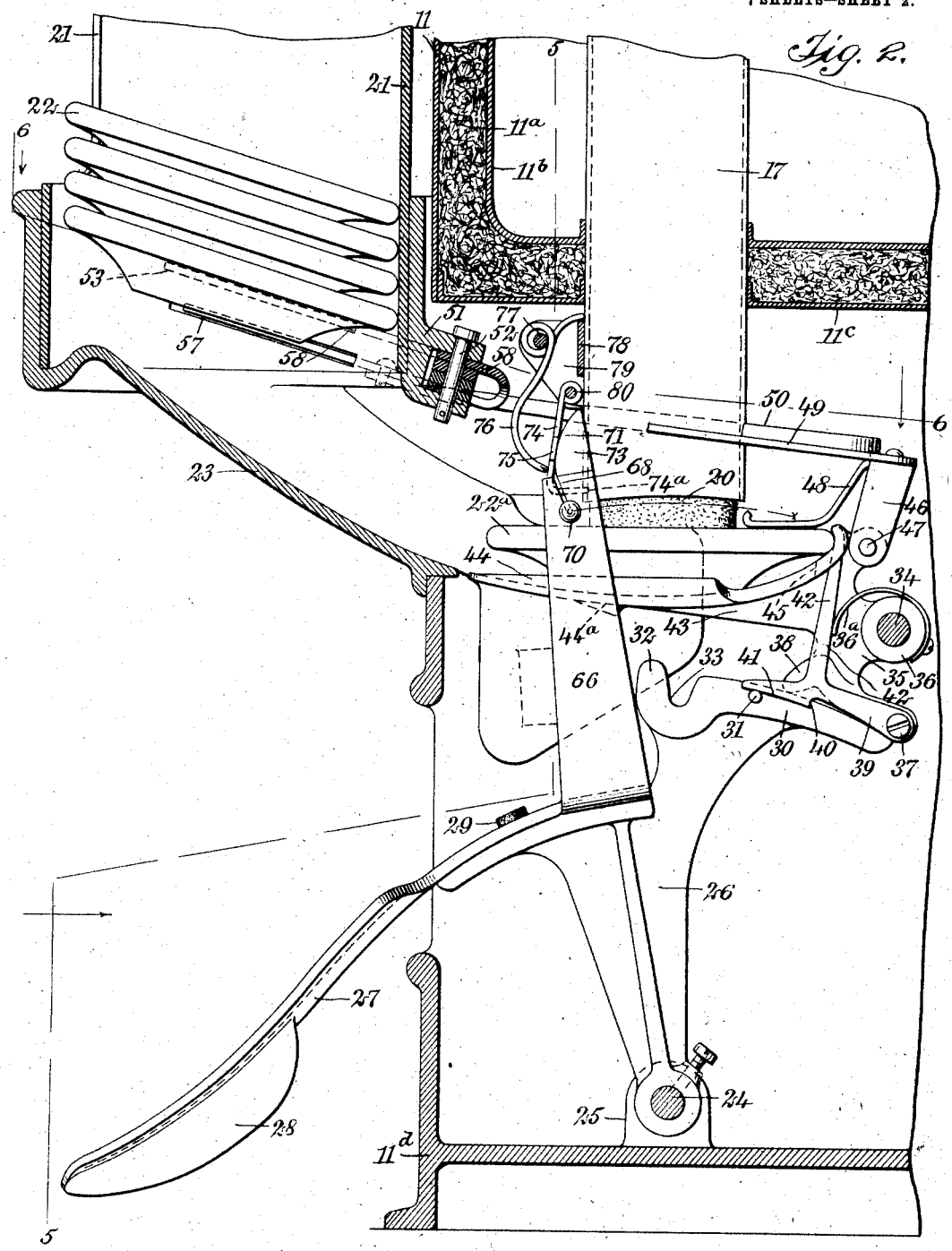
Figure 3:
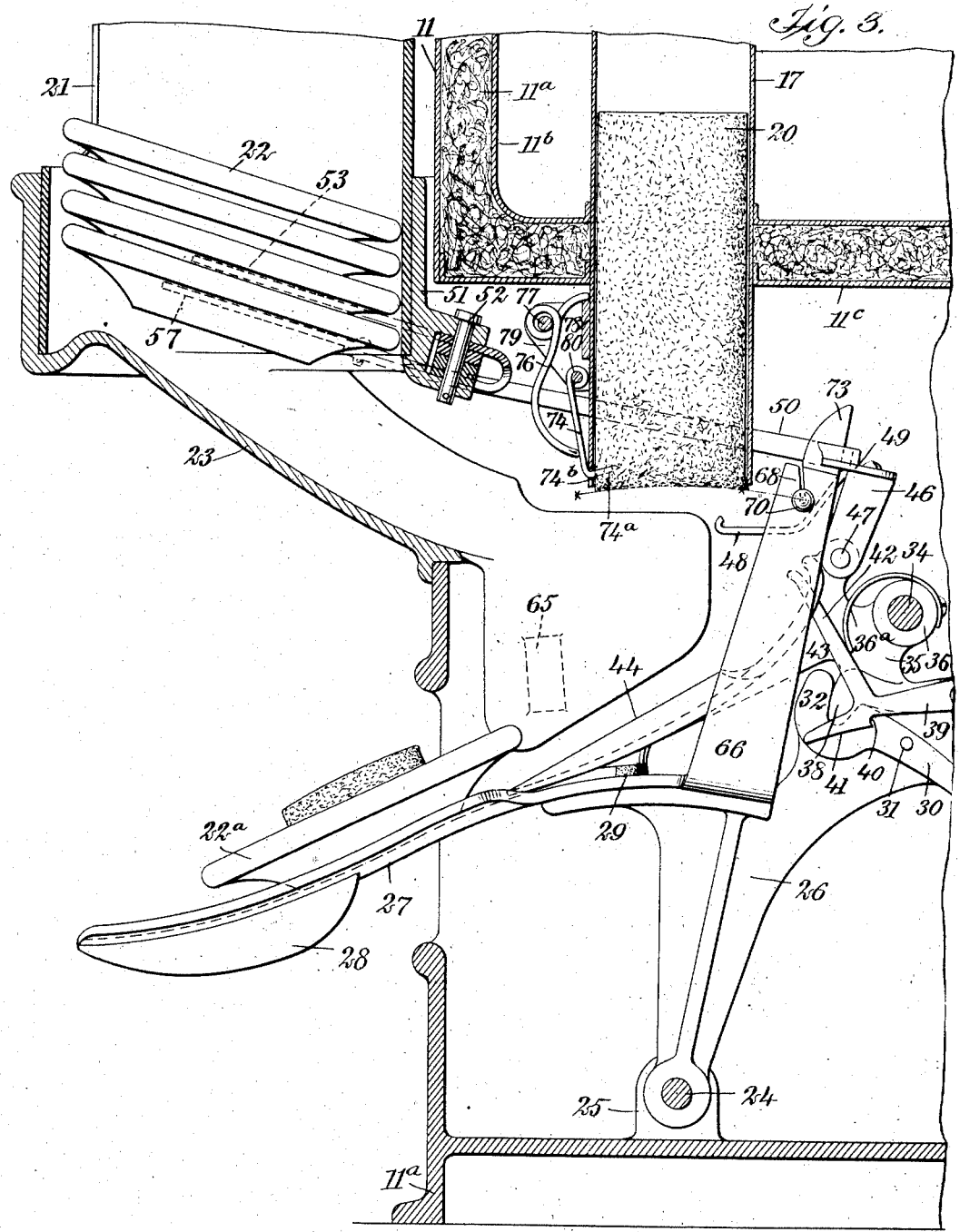

Figure 1 is a side elevation showing the water cooler partly broken away and provided with a rack for holding the butter dishes to be filled; the view further showing the butter tube extending vertically through the refrigerator and partly filled with butter to be used in filling the butter plates; Fig. 2 is a fragmentary section showing a manually-operated lever and parts associated therewith for the purpose of dislodging the butter dishes one at a time, filling said dishes with butter and ejecting said dishes when filled; Fig. 3 is a section somewhat similar to Fig. 2, but showing one of the butter dishes as filled and as gliding out of the machine; Fig. 4 is a view similar to Fig. 2 and showing the positions indicated by various parts while a butter dish is gliding from the bottom of the rack into the position which it is to occupy while being filled; Fig. 5 is a fragmentary section upon the line 5—5 of Fig. 2, looking in the direction of the arrow, and showing the lower portion of the machine as viewed from the left of Fig. 2; Fig. 6 is a horizontal section upon the line 6—6 of Fig. 2, looking in the direction of the arrow, and showing the movable jaws used for disengaging the butter dishes, and further showing the various parts relating to the cutting of the butter and ejection of the dishes when filled; Fig. 7 is a fragmentary view somewhat similar to the left hand portion of Fig. 6, but showing the movable jaws occupying different positions from those occupied in said figure; Fig. 8 is a vertical section upon the line 8—8 of Fig. 6, looking in the direction of the arrow, and showing the column of butter plates resting temporarily upon the upper jaws; Fig. 9 is a section upon the line 9—9 of Fig. 7, looking in the direction of the arrow, and showing the column of butter plates as now resting upon the lower jaws preparatory to separating the lowermost butter plate from the rest of the column; and Fig. 10 is a horizontal section upon the line 10—10 of Fig. 1, looking in the direction of the arrow.

A cooler 11 adapted to hold water and ice is provided with a filling $11^a$ and with an inner wall $11^b$, and is further provided with a bottom $11^c$ and a supporting base $11^d$, the latter being hollow. The cooler is provided with a removable top 12 and also with a faucet 13, the latter being used for removing water. The cooler is further provided with a drawer 14 having a knob 15, by aid of which the drawer may be removed.

Mounted within the cooler and extending through the bottom $11^c$ is a square tube 17 which projects upwardly into an opening 18 in the top 12. A lid 19, hinged upon the top 12, is adapted to cover and uncover the opening 18. A quantity of butter 20 having the form of a square rod is placed within the tube 17 and gradually used up, as hereinafter described. A rack 21 contains butter dishes 22 which are to be filled. Below the rack 21 is a chute 23' within which the butter plates are adapted to glide downwardly one at a time, one such plate detached from the others being shown at $22^a$.

Mounted within the base of the machine is a shaft 24 resting in bearings 25. A rocker arm 26 is secured rigidly upon this shaft and is provided with a portion 27 serving as a chute, a weight 28 being mounted upon the under side of this chute. A rubber buffer 29 is mounted upon the upper end of the chute 27 for a purpose hereinafter described. The upper end of the arm 26 is provided with an arcuate portion 30 carrying a pin 31. The rocker arm 26 is further provided with a lug 32 and with a notch 33 intermediate said lug and said arcuate portion 30.

A shaft 34 is mounted within the back of the machine and rests in journals 34$^a$. A rocking plate 35 is provided with a bearing collar 36 which is secured rigidly upon the shaft 34. A leaf spring 36$^a$ is secured at one of its ends upon the bearing collar 36 and has a general involute form. The rocking plate 35 carries a pin 37, and journaled upon the latter is an arm 39 provided with a shoulder 40, the arm and shoulder being adapted to serve as a hook. Adjacent to the arm 39 is a lug 38, integral with the rocking plate 35. The arm 39 is further provided with a flat bearing surface 41 which normally rests upon the pin 31. The arm 39 is also provided with a portion 42 integral with it and extending upward.

A tray 44 is mounted upon a web 43 integral with it, and is provided with a lug 44$^a$ which, under certain conditions, may engage the rubber buffer 29. The tray 44 is also provided with a slot 45 in which the upwardly extending portion 42 of the arm 39 is adapted to play, as will be understood from Fig. 2. The tray 44 supports a bracket 46, being pivoted thereto by a pin 47. A spring hook 48 is connected with the bracket 46, both of these members being riveted to a plate 49 of substantially U shape, this plate being provided at one side with a rib 50 whereby it is strengthened.

The parts are so arranged that when the tray 44 rocks, it transmits motion to the U-shaped plate 49, causing the latter to reciprocate in the approximate direction of its general length. The lower end of the rack 21 is mounted upon a bracket 51 carrying a pin 52. A pair of jaws 53, 54, journaled upon the pin 52, extends into the rack 21 from opposite sides thereof, the jaw 53 being a little higher than the jaw 54, as will be understood from Fig. 9. The jaws are integral with a strip 55 and consequently integral with each other. This strip bends downwardly from the plane occupied by the jaw 53 to the plane occupied by the jaw 54, as will be understood from Figs. 7, 8. Two other jaws 56, 57 are disposed upon opposite sides of the rack 21 and extend slightly into the same. These jaws are connected integrally together by a strip 58 which is bent so as to compensate for the difference in level of the two jaws, the jaw 56 being higher than the jaw 57, as will be understood from Figs. 7, 8. All of the jaws 53, 54, 56, 57 have a little play relatively to the rack 21 and extend into the latter through the slots 58$^a$ (see Fig. 9). The jaw 54 is pivoted upon a pin 59 and the jaw 57 is similarly pivoted upon a pin 60, these pins being carried by the plate 49 which, as above explained, is of substantially U shape.

Housings 61 disposed upon opposite sides of the rack 21 are provided for partially encircling the jaws so as to conceal them and protect them from the action of dust. These housings are mounted upon plates 62 secured in position by aid of rivets 63, the plates 62 also serving to support the rack 21. Guide plates 64, integral with the chute 23, serve to guide the butter plates as they move along the chutes 23 and 27.

Mounted upon the upper end of the rocker arm 26 and extending upwardly therefrom are two spring arms 66, 67. Mounted partially within the path of these arms are stationary lugs 65 serving as limiting stops therefor. These arms are provided adjacent to their upper ends with slots 68 extending obliquely downward. A wire 69, provided at its ends with heads 70, extends from the arm 66 to the arm 67, being normally stretched tightly by the tension of these arms; that is, the tendency of these arms to spring apart is normally restrained by the wire 69. The spring arm 66 is bent inwardly so as to form a horizontal portion 72 and is bent upwardly so as to form a vertical portion 73, the latter having an arcuate face 71.

A plate 74 is provided with a lug 75 and is engaged by a leaf spring 76, the latter being wound around a pin 77 and resting against a plate 78. A bracket 79 secured to this plate supports the pin 77 and spring 76. A pin 80 is mounted upon the bracket 79 and supports the plate 74. The plate 74 is provided at its bottom with a toe 74$^a$ which extends into a slot 74$^b$ in the lower end of the tube 17 for the purpose of supporting the body 20 of butter, as will be understood from Fig. 3. The plate 49 is provided with a notch 81 for a purpose which will hereinafter appear.

The drawer 14 is adapted to hold any number of rods 82, 83, of butter, and the latter are removed as desired and placed one at a time within the tube 17.

The operation of my device is as follows: The parts being arranged as above described, the rack 21 is filled or partially filled with butter plates 22. A body 20 of butter is lowered into the square tube 17 where it, of course, assumes an upright position, and the cooler 11 is filled or partially filled with water and ice. The lowermost butter plate now rests upon the jaws 53, 56, as indicated in Figs. 2 and 8. The tray 44 now occupies its normal position, a little below the lower end of the tube 17. The plate 74, spring 76 and arms 66, 67 occupy their respective normal positions, as indicated in Fig. 2. A butter plate 22ª rests upon the tray 44. Suppose, now, that the operator desires to secure a plate of butter. He grasps the chute 27, as indicated in Fig. 10, and raises it so as to swing the rocking arm 26 to the right, according to Fig. 2. This causes the spring arms 66, 67, to move to the right and the wire 69 cuts directly through the rod 20 of butter, severing a portion thereof which, of course, rests in the butter plate 22ª, as will be seen from Figs. 2 and 4. As the rocker arm 26 moves to the right, according to Fig. 2, the lug 38 drops into the notch 33 and further movement of the rocker arm in the same direction causes the rocking plate 35 to turn slightly upon the shaft 34 as a center. This tilts the tray 44 as indicated in Fig. 3, and the butter plate 22ª, with its contents, glides downwardly upon the chute 27 and is removed by hand. The spring hook 48 serves to prevent the severed butter piece from sticking to the cutting wire 69. The movement of the rocking plate 35 causes the brackets 46 to move the U-shaped member 49 slightly to the left, and this causes the jaws 54, 57 to move toward each other, as indicated in Figs. 7, 9, the jaws 53, 56 meanwhile moving slightly away from each other. The column of butter plates is now lowered a distance representing the thickness of one plate, as will be seen by contrasting Figs. 8 and 9. As the spring arms 66, 67 carrying the wire 69 move to the right, according to Fig. 3, in executing the movement just described, the plate 74, normally resting with its lug 75 against the rounded bearing surface 71 of the arm 66, is released. Hence, the action of the spring 76 forces the lower end of the plate 74 toward the lower end of the tube 17, the toe 74ª being thrust slightly into the body of butter 20. This prevents, for the moment, any downward movement of the body of butter 20. The dish 22ª and its contents (see Fig. 3) having been removed, the weight 28 now carries a chute 23 downward as will be seen from Fig. 4. The rocker arm 26 now moves to the left, or in a contraclockwise direction, according to Fig. 4. By this movement the pawl 38 is disengaged from the notch 33 and forces the tray 44 back into its normal position. During the time this is done, the pawl 38 glides upon the arcuate portion 30 of the rocker arm 26, thus maintaining the tray 44 in a substantially horizontal position. The shoulder 40, on the arm 39, engages the pin 31, and thus arrests the motion of the rocker arm 26 which then regains its normal position. This movement of the rocking plate 35, however, causes the bracket 46 to move the U-shaped member 49 again to the left, the result being that the jaws 54, 57 (see Fig. 9) are now drawn apart, the jaws 53, 56 at the same instant approaching each other, thereby liberating the lowermost of the butter plates and allowing the same to glide down the chute 23 to a point below the tube 17. The released butter plate, in taking up its position under the tube 17, engages the arm 42 of the arm 39, thereby disengaging the pin 31 from the shoulder 40. The downward movement of the chute 27 continues until the wire 69 is brought back to its normal position. The action just described is for the purpose of preventing premature disengagement of the toe 74ª from the butter rod 20. That is to say, the action described is to prevent the dropping of the butter rod until a butter plate takes up its position directly under the tube 17. The spring arms 66, 67, being now restored to their normal positions, the bearing surface 71 of the arm 66 lodges against the lug 75 and by moving the plate 74 withdraws the toe 74ª. This allows the rod 20 of butter to descend so that its lower end engages the plate resting upon the tray 44.

The operation may be repeated over and over again until all of the butter is removed. Each down stroke of the tray 44 is cushioned by the rubber buffer 29 so that no shock to the machine takes place. It may sometimes happen, especially if the butter be exceedingly hard or the machine be operated carelessly by inexperienced persons, that a considerable strain is thrown upon the wire 69. Usually this occurs when the wire first encounters the resistance offered by the rod of butter it is cutting. Should this result in breaking the wire 69, no damage can be done.

The breaking of the wire can hardly occur except while the chute 27 is being raised, and when it does occur the spring arms 66, 67, being normally restrained by the wire 69 and being suddenly liberated, simply move a little farther apart. The portion 73 of the arm 66 clicks into the notch 81 of the plate 49 (see Fig. 6) and prevents further movement of the machine until the wire can be repaired.

From the above description it will be noted that all danger of the butter-rod 2 descending prematurely is effectively prevented. The toe 74ª supports the butter-rod when the parts are in the position indicated in Fig. 3, and as the rocker-arm 26 moves to the right, according to this figure, the pin 31 engages the shoulder 40, so that the arm 39 is unable to descend and for the moment the rocker-arm 26 is not free to return. The descent of a butter-plate, however, by engaging the member 43, raises the arm 39 and liberates the rocker-arm 26, which may thereupon be returned to its normal position; the movable parts otherwise acting as above described. Unless, therefore, a butter-plate glides downwardly over the chute 23 into a position directly beneath the butter-rod, the toe 74 cannot be actuated so as to release the butter-rod. Hence, the butter-rod can never descend in the absence of a butter-plate directly under it and consequently it will never rest directly upon the chute 27 so as to clog the action of the mechanism or otherwise cause damage.

Having thus described my invention, I claim as new and desire to secure by Letters Patent:

1. A device of the character described, comprising a rack for holding plates, movable jaws projecting partially into said rack for the purpose of disengaging said plates, means for actuating said jaws, a chute for guiding said plates one at a time into a predetermined position, and mechanism for filling said plates individually with charges of material used as stock.

2. The combination of a rack for holding plates stacked in the form of a column, a pair of jaws co-acting with said rack and movable thereinto for the purpose of supporting said column of plates, another pair of jaws co-acting with said first-mentioned pair of jaws and disposed in a different plane therefrom for the purpose of supporting said column of plates at a different moment from that when said column is supported by the other pair of jaws, means for guiding said plates one at a time into a predetermined position, and mechanism for emptying into each of said plates a charge of butter or the like.

3. The combination of means for holding a quantity of butter or the like, a wire for severing portions of said butter, spring arms connected with said wire and normally stretching the same tight so as to keep it taut for the purpose of enabling it to cut said butter, mechanism co-acting with said spring arms for loading said butter into plates and moving said plates, and means co-acting with said last-mentioned mechanism for preventing movements of said spring arms in case said wire is broken.

4. The combination of a tubular member adapted to hold a charge of butter or the like, a gate movable relatively to said tubular member and provided with a toe for entering the same, means for cutting off a portion of said material projecting from said tubular member, and mechanism co-acting with said last-mentioned means for temporarily checking the movement of said material from said tubular member while the cut is being made.

5. The combination of a member for holding a rod of butter or other stock, means for temporarily preventing the travel of said stock into a position where said stock may be cut, a traveling member for cutting said stock, means for actuating said traveling member so as to cut said stock, and mechanism controllable by movements of a butter-plate or the like for temporarily preventing the travel of said butter or other stock.

6. The combination of a swinging tray adapted to hold a butter plate, a shaft disposed adjacent thereto, a rocker-plate mounted upon said shaft and adapted to rock, a rocker-arm provided with means for actuating said rocker-plate, an arm pivotally mounted upon said rocker-plate and provided with a portion for engaging a butter plate resting upon said tray, a spring for pressing said last-mentioned portion toward said butter plate for the purpose of dislodging the latter when said butter plate is tilted, and means controllable at will for actuating said last-mentioned arm.

7. A device of the character described, comprising a vertically disposed tubular member for holding a supply of butter or the like, means for temporarily supporting a plate below said tubular member so that said supply of butter may rest by its own weight upon said plate, cutting mechanism for severing the lower portion of said supply of butter, means for actuating said cutting mechanism, and mechanism co-acting with said means for the purpose of ejecting said plate after being filled with said butter or the like.

8. A device of the character described, comprising a vertically-disposed tubular member for holding a quantity of stock in the general form of a vertically disposed rod, a tray mounted adjacent to said tubular member and adapted to swing, said tray being further adapted to support a plate in registry with and located below said tubular member for the purpose of resting the weight of said rod upon said plate, mechanism for severing a portion of said rod so as to fill said plate, means independent of said plate for periodically sustaining the weight of said rod when otherwise unsupported, and mechanism controllable at will for causing the release of said plate from said tray.

In testimony whereof I have signed my name to this specification in the presence of two subscribing witnesses.

OTTO W. MOBERG.

Witnesses:
GEORGE H. PURVIS,
W. HOWARD NELSON.